(12) United States Patent
Albertelli et al.

(10) Patent No.: US 11,827,006 B2
(45) Date of Patent: Nov. 28, 2023

(54) COMPOSITE MATERIALS AND USES THEREOF

(75) Inventors: Aldino Albertelli, London (GB); Michael Frieh, London (GB)

(73) Assignee: Acell Industries Limited, Cork (IE)

( * ) Notice: Subject to any disclaimer, the term of this patent is extended or adjusted under 35 U.S.C. 154(b) by 248 days.

(21) Appl. No.: 13/810,256

(22) PCT Filed: Dec. 15, 2010

(86) PCT No.: PCT/GB2010/052099
§ 371 (c)(1),
(2), (4) Date: Jul. 1, 2013

(87) PCT Pub. No.: WO2012/007703
PCT Pub. Date: Jan. 19, 2012

(65) Prior Publication Data
US 2013/0273341 A1    Oct. 17, 2013

(30) Foreign Application Priority Data

Jul. 16, 2010 (GB) ...................... 1012010

(51) Int. Cl.
*B32B 5/18* (2006.01)
*B32B 5/24* (2006.01)
(Continued)

(52) U.S. Cl.
CPC .................. *B32B 5/32* (2013.01); *B32B 5/18* (2013.01); *B32B 5/245* (2013.01); *B32B 7/12* (2013.01);
(Continued)

(58) Field of Classification Search
CPC .. B32B 5/18; B32B 5/245; B32B 5/32; B32B 7/12; B32B 2250/40; B32B 2260/021;
(Continued)

(56) References Cited

U.S. PATENT DOCUMENTS 2,975,488 A * 3/1961 Brauner ................. B29C 44/12
156/242
3,503,841 A * 3/1970 Sterrett ................... B29C 70/00
156/79

(Continued)

FOREIGN PATENT DOCUMENTS

DE   102004016874 A1   10/2005
FR   2722811 A1 *   1/1996
(Continued)

OTHER PUBLICATIONS

International Search Report dated May 2, 2011, in Application Serial No. PCT/GB/2010/052099.

*Primary Examiner* — Michael A Tolin
(74) *Attorney, Agent, or Firm* — Ryan T. Grace; Advent, LLP (57) ABSTRACT

The present invention relates to composite materials and the use thereof as energy resistant, for example blast-resistant, materials. Preferred aspects of the invention relate to layered composite panels comprising solid foam materials which have both a blast attenuation function and an anti-ballistic function. In further aspects, the invention provides novel composite panels which are suitable for use as blast resistant and/or anti-ballistic materials. In some examples described, the layered composite panel comprises a polymeric material (10) bonded to a first solid open-cell foam panel (12), and a cured polymeric material (14) penetrates a surface of the first solid open-cell foam panel (12).

29 Claims, 4 Drawing Sheets

(51) Int. Cl.
*B32B 5/32* (2006.01)
*B32B 7/12* (2006.01)
*F41H 5/04* (2006.01)

(52) U.S. Cl.
CPC .............. *F41H 5/04* (2013.01); *F41H 5/0478* (2013.01); *F41H 5/0492* (2013.01); *B32B 2250/40* (2013.01); *B32B 2260/023* (2013.01); *B32B 2260/046* (2013.01); *B32B 2266/0214* (2013.01); *B32B 2266/0271* (2013.01); *B32B 2266/06* (2013.01); *B32B 2305/076* (2013.01); *B32B 2571/02* (2013.01); *Y10T 428/24992* (2015.01); *Y10T 428/249958* (2015.04); *Y10T 428/249974* (2015.04); *Y10T 428/249981* (2015.04)

(58) Field of Classification Search
CPC ........ B32B 2260/023; B32B 2260/046; B32B 2266/0285; B32B 2266/06; B32B 2305/022; B32B 2305/07; B32B 2305/076; B32B 7/08; B32B 27/065; B32B 33/00; B32B 2262/101; B32B 2266/0214; B32B 2266/0271; B32B 2307/558; B32B 2571/02; B29C 44/5627; B29C 44/5681; B29C 44/569; B29C 44/5618; B29C 44/5636; F41H 5/04; F41H 5/0478; F41H 5/0492; F41H 5/0471; F41H 5/18; Y10T 428/24992; Y10T 428/249958; Y10T 428/249974; Y10T 428/249981

See application file for complete search history.

(56) References Cited

U.S. PATENT DOCUMENTS

| | | | | |
|---|---|---|---|---|
| 3,567,568 | A | | 3/1971 | Windecker ...................... 161/93 |
| 3,595,821 | A | * | 7/1971 | Spector .................... C08G 8/30 |
| | | | | 428/425.1 |
| 3,755,063 | A | * | 8/1973 | Massey ................... B29C 67/20 |
| | | | | 114/357 |
| 3,872,199 | A | * | 3/1975 | Ottinger .................... E06B 3/86 |
| | | | | 425/134 |
| 4,488,619 | A | | 12/1984 | O'Neill ........................ 181/290 |
| 4,595,710 | A | * | 6/1986 | Albertelli ............... C08J 9/0061 |
| | | | | 428/318.4 |
| 5,060,291 | A | | 10/1991 | Albertelli ................... 428/306.6 |
| 5,362,429 | A | | 11/1994 | Orlewicz et al. |

FOREIGN PATENT DOCUMENTS

| | | | |
|---|---|---|---|
| GB | 2 342 278 A | 10/1998 | .............. F41H 1/02 |
| GB | 2 451 795 A | 8/2007 | .......... G10K 11/168 |
| GB | 2 464 541 A | 10/2008 | ............... B32B 5/18 |
| WO | 1997/016697 | 5/1997 | .............. F42B 39/14 |
| WO | 2007/141488 A1 | 12/2007 | .............. F42D 5/045 |

* cited by examiner

COMPOSITE MATERIALS AND USES THEREOF

This invention relates to the use of composite materials as energy resistant, for example blast-resistant, materials. Preferred aspects of the invention relate to layered composite panels comprising solid foam materials which are able to reduce the effects of an energy wave from an explosive blast, e.g. from an exploding bomb, below levels which can cause catastrophic damage to persons or to buildings, vehicles and other structures in the vicinity of the explosion. In preferred aspects, the invention relates to the use of layered composite panels to mitigate the effects of both energy waves and high-velocity fragments that result from explosions. In further preferred aspects, the invention relates to the use of the layered composite panels to also provide protection against projectiles, e.g. bullets. Thus, the composite materials used according to the invention preferably have both a blast attenuation function and an anti-ballistic function. In further aspects, the invention provides novel composite panels which are suitable for use as blast resistant and/or anti-ballistic materials.

Protection of buildings, vehicles and other structures against the effect of explosive blasts is an important consideration in many environments, for example in war zones, in locations where there is a risk of terrorist attacks, or in environments where there is a risk of accidental explosion, such as industrial sites. As well as the possibility of physical injury to persons in the vicinity of explosions, conventional building materials provide very low levels of resistance to energy waves from explosions. For example, a brick and mortar wall of conventional structure has very low resilience and can easily be demolished by bombs of the type used by the military and by terrorists. In addition, even where a wall or building of conventional brick and mortar construction is not demolished by an explosion, the energy wave may be transmitted through the structure in such a way that portions of brick and/or mortar and/or plaster on the opposite face the wall may detach from the structure at high velocity posing a danger to persons and/or infrastructure behind the wall/in the building.

For these reasons, measures to protect against explosive blasts are widely used in military, governmental, business and industrial applications to avoid casualties and to reduce damage to infrastructure.

Traditionally, blast protection structures are designed to reflect the energy waves from explosive blasts away from a target. Generally such structures comprise steel, concrete or reinforced concrete barriers, and have to be extremely bulky to provide adequate protection. For example, concrete blast protection structure have a thickness of at least 30 cm to provide adequate protection, and are often much thicker, for example of the order of 1.0 m or more. Such structures are time-consuming to install, and can be difficult to transport to the required location due to their weight and bulk. In particular, such structures are completely unsuited to rapid deployment, e.g. by air, as required by many military operations. Additionally, due to their bulk and unattractive appearance, these structures are unsuited for sensitive inner-city locations, where space is at a premium and architectural appeal is desirable.

Due to the disadvantages associated with blast-reflective structures, there is a need in the art for blast protection materials and structures which a capable of absorbing to an extent the energy from energy waves associated with explosive blasts.

One class of materials that have been developed to address this problem are those containing porous resin-bonded aggregates. In these materials, aggregate particles, such as stone, ceramic or glass chips, are bonded into a matrix using an adhesive or resin, for example a polyurethane resin (see WO 97/16697). The resulting matrix is highly porous, such that an explosive blast can be absorbed by breaking of the bonds between the particles and densification of the matrix, as well as by diffraction of the energy wave through the voids in the matrix. In one development, the particulate material may be crushable under the impulse of a blast energy wave, with hollow glass spheres and pumice being examples of such materials (see WO 2007/141488). Due to the porosity of the matrix, these composite materials are lighter than conventional reinforced concrete, and require less bulk due to their energy absorbing properties. However, the crushing of these structures often makes them unsuitable for reuse, and therefore unsuitable for use in environments where a target may be subject to multiple attacks. Furthermore, there is still a need for yet lighter materials.

Another approach involves the use of fibre-reinforced cementitious panels containing, for example, glass fibre or steel fibre reinforcement. Such materials have high compressive and tension strength compared to non-reinforced cementitious materials, and good anti-ballistic and blast resistant properties. However, the weight of these materials still makes them unsuitable for a number of applications.

The present invention further extends the range of materials available for use in providing protection against energy waves, such as explosive blast energy waves, and airborne projectiles.

In a first aspect, the present invention provides the use of a layered composite panel as a blast-resistant and/or anti-ballistic shield, wherein the layered composite panel comprises: (i) a first surface layer of a sheet form polymeric material; and (ii) a core comprising or consisting of a first solid, open-cell foam panel, wherein the sheet form polymeric material comprises a cured polymeric material which penetrates a surface of the open-cell foam panel forming a bond between the first surface layer and the core.

In accordance with this aspect of the invention, the first solid, open-cell foam panel preferably comprises or consists of a polymeric foam. Examples of solid, open-cell polymeric foams which may be used in accordance with this aspect of the present invention include phenolic resin foams, polystyrene foams, polyurethane foams, polyethylene foams, polyvinylchloride foams, polyvinylacetate foams, polyester foams polyether foams, and foam rubber. Preferably, the polymeric foam is selected from phenolic resin foams.

It has been found that the mechanical properties of phenolic resin foams make them particularly suitable for use in blast-resistant and/or anti-ballistic shields. Further, the use of sheet-form polymeric material in conjunction with the phenolic resin foams provides panels of extremely high strength, and high resistance to delamination and fragmentation under the impact of an explosive energy wave. Thus, the layered composite panels provide exceptional protection from explosive blasts and ballistic materials.

In another aspect, the present invention provides the use of a layered composite panel as a blast-resistant and/or anti-ballistic shield, wherein the layered composite panel comprises: (i) a first surface layer of a sheet form polymeric material; and (ii) a core comprising or consisting of a first solid, open-cell phenolic resin foam panel, wherein the sheet form polymeric material is bonded to a surface of the core.

In accordance with this aspect of the invention, the first surface layer of a sheet-form polymeric material preferably comprises a cured polymeric material. More preferably, the cured polymeric material penetrates a surface of the first solid open-cell foam panel so as to form the bond between the first surface layer and the core.

In another aspect, the present invention provides the use of a layered composite panel as a blast-resistant and/or anti-ballistic shield, wherein the layered composite panel comprises: (i) a core comprising or consisting of a first solid, open-cell foam panel and a second solid foam panel wherein the foam panels are bonded together by an adhesive or other bonding agent so as to form a monolithic layered structure; and optionally (ii) a first surface layer of a sheet form polymeric material, wherein the sheet form polymeric material is bonded to a surface of the core.

In accordance with this aspect of the invention, the first solid, open-cell foam panel preferably comprises or consists of a polymeric foam as described above.

In accordance with this aspect of the invention, the first surface layer of a sheet-form polymeric material, where present, preferably comprises a cured polymeric material. More preferably, the cured polymeric material penetrates a surface of the first solid open-cell foam panel so as to form the bond between the first surface layer and the core.

In a further aspect, the present invention provides a layered composite panel comprising: (i) a core comprising or consisting of a first solid, open-cell foam panel and a second solid foam panel wherein the foam panels are bonded together by an adhesive or other bonding agent so as to form a monolithic layered structure; and optionally (ii) a first surface layer of a sheet form polymeric material, wherein the sheet form polymeric material is bonded to a surface of the core, with the proviso that the adhesive or other bonding agent does not form an air-tight sealing coating around a foam panel of the core.

The novel layered composite panel of this aspect of the invention may advantageously be used as a blast-resistant shield.

In accordance with this aspect of the invention, the first solid, open-cell foam panel preferably comprises or consists of a polymeric foam as described above.

In accordance with this aspect of the invention, the first surface layer of a sheet-form polymeric material, where present, preferably comprises a cured polymeric material. More preferably, the cured polymeric material penetrates a surface of the first solid open-cell foam panel so as to form the bond between the first surface layer and the core.

In accordance with the foregoing aspects of the invention, the first solid, open-cell foam panel is preferably non-elastically deformable when pressure is applied beyond a certain limit. In some examples, the first solid, open-cell foam panel may deform plastically, retaining cohesion as a single object. In other examples, the first solid, open-cell foam panel may be frangible, i.e. it may break into fragments when pressure is applied.

As used herein, the term non-elastically deformable refers to an open-cell foam which undergoes irreversible change to the foam structure when pressure is applied beyond a certain limit, i.e. by crushing, collapsing or fragmenting. Thus, the foam is intended to absorb energy from an energy wave by non-elastic deformation.

In preferred examples, the first solid, open-cell foam panel is progressively deformable, such that the cells of the foam closest to an applied force collapse, fragment or are crushed first, with the cells further away from the applied force initially remaining intact.

The first solid, open-cell foam panel may include a finely-divided particulate reinforcing material. Suitable particulate reinforcing materials are preferably inert and insoluble. The reinforcing material may be present in an amount of up to 10 weight percent based on the total weight of the foam, for example from 2 to 10 weight percent, or 5 to 10 weight percent based on the total weight of the foam. Suitable reinforcing materials include organic or inorganic (including metallic) particulate materials, which may be crystalline or amorphous. Even fibrous solids have been found to be effective, although not preferred.

Non-limiting examples of suitable particulate materials include clays, clay minerals, talc, vermiculite, metal oxides, refractories, solid or hollow glass microspheres, fly ash, coal dust, wood flour, grain flour, nut shell flour, silica, mineral fibres such as finely chopped glass fibre and finely divided asbestos, chopped fibres, finely chopped natural or synthetic fibres, ground plastics and resins whether in the form of powder or fibres, e.g. reclaimed waste plastics and resins, pigments such as powdered paint and carbon black, and starches.

In some examples, the first solid, open-cell foam panel may further include chips of stone, ceramic, glass or other aggregate materials embedded in the open-cell foam matrix. Preferably, the chips have a size of from 2 to 50 mm in each dimension, more preferably from 2 to 20 mm in each dimension. These materials have been found to improve the anti-ballistic properties of the composite panels of the invention, for example by preventing bullets from penetrating the panels.

Preferably the first solid open-cell foam panel has a density in the range of 100 to 500 $kg \cdot m^{-3}$, more preferably 120 to 400 $kg \cdot m^{-3}$, and most preferably 120 to 250 $kg \cdot m^{-3}$, exclusive of any aggregate chips that may be embedded in the foam.

The physical properties of such foams, especially the compressive strength and deflection under load are believed to be related to (amongst other factors) cell wall thickness and average cell diameter. Preferably, the average cell diameter of the solid open-cell foam is in the range of about 0.5 mm to 5 mm, more preferably 0.5 or 1 mm to 2 or 3 mm.

The cells or pores of the first solid open-cell foam panel are preferably open to a surface of the core on which sheet form polymeric material is applied, and preferably they open out below the surface to a greater width than the opening, thereby providing an undercut which enhance bonding of the sheet form polymeric material to the open cell foam.

In some aspects of the present invention, the first surface layer of a sheet-form polymeric material is formed from a sheet-form curable polymeric material, for example a thermosetting polymeric material.

The sheet-form polymeric material preferably comprises a matrix comprising or consisting of a thermosetting polymer resin, for example, a thermosetting polymer resin matrix selected from polyester resins, vinyl ester resins, epoxy resins, phenolic resins, bismaleimide resins or polyimide resins. Most preferably, the sheet-form polymeric material comprises a thermosetting polymer resin matrix selected from polyester resins. The sheet-form polymeric material may also include melamine, which is useful as a fire retardant. The sheet-form polymeric material may further include additives selected from hardeners, accelerators, fillers, pigments, and/or any other components as required.

In some examples, the sheet-form polymeric material may be cured in contact with a solid open-cell foam panel of the core, such that a bond is formed without the need for an adhesive layer. For example, the bond may be produced by pressing sheet-form curable polymeric material and the solid, open-cell foam panel together and curing the sheet-form curable polymeric material with heat. In this way, at least a portion of material from the sheet-form curable polymeric material can flow into the cells and interstices of the open-cell foam to form a bond between the core and the sheet-form polymeric material as it cures.

In some examples, the cured polymeric material may penetrate the solid, open-cell foam to a depth which is at least equivalent to the average cell diameter of the foam, more preferably to a depth which is at least equivalent to two times the average cell diameter of the foam. Alternatively, the cured polymeric material may penetrate the solid, open-cell foam to a depth of at least 0.5 mm, more preferably at least 1.0 mm, and still more preferably at least 2.0 mm, for example 2.5 mm or 3.0 mm.

In this way, the sheet-form polymeric material forms a skin on the solid open-cell foam panel which is mechanically keyed into the surface of the solid open-cell foam panel. By "mechanically keyed" it is meant that at least a portion of the sheet-form polymeric material penetrates at least a portion of the solid open-cell foam panel and forms a mechanical interaction with the solid open-cell foam panel. Thus, at least a portion of the sheet-form polymeric material becomes effectively entrapped within the outer cells of the solid open-cell foam panel to form a strong mechanical bond. In this way, a stable monolithic layered composite structure is obtained without the need for an adhesive to be applied between the layers.

In some cases, it has been found that the bond achieved at the interface of the skin and a solid open-cell foam panel is stronger than the material of the foam panel itself. As a result, the layered composite panels used according to the invention are extremely strong, highly-resistant to delamination of the sheet-form material from the core, and highly-resistant to fragmentation of the core under the impact of an explosive energy wave. Specifically, it has been found that the sheet-form polymeric material acts as a flexible retaining layer which maintains the integrity of the solid, open-cell foam panel even as it is deformed/crushed by an explosive energy wave. It has been found that these constructions provide exceptional protection from explosive blasts and ballistic materials.

In other embodiments of the invention, an adhesive layer may be provided between the first surface layer of a sheet-form polymeric material and the solid, open-cell foam panel. In principle, any type of adhesive or other bonding agent suitable to form a strong bond between the two layers may be used.

The sheet-form polymeric material preferably comprises reinforcement, for example reinforcing fibres. The fibres may include one or more materials. For example the fibres may include one or more of carbon fibres, glass fibres, aramid fibres and/or polyethylene fibres, such as ultra-high molecular weight polyethylene (UHMWPE). In one preferred embodiment, the reinforcement comprises or consists of glass fibres, for example E-glass fibres or S-glass fibres.

The reinforcing fibres may be short fibres, for example having lengths of 5.0 cm or less, or may be longer fibres. The fibres may be loose, for example, the fibres may be arranged in a uni- or multi-directional manner. The fibres may be part of a network, for example woven or knitted together in any appropriate manner. The arrangement of the fibres may be random or regular, and may comprise a fabric, mat, felt or woven or other arrangement. Fibres may provide a continuous filament winding. Optionally, more than one layer of fibres may be provided.

Preferably the sheet-form polymeric material comprises SMC (sheet moulding compound). The SMC preferably includes a thermosetting polymer matrix as defined above and reinforcing fibres also as defined above. For example, the SMC may include a thermosetting resin, for example a polyester resin, together with reinforcing fibres, for example glass fibres. The thermosetting polymer may further comprise additives, for example minerals, inert fillers, pigments, stabilizers, inhibitors, release agents, catalysts, thickeners, hydrating additives and/or other suitable materials.

There are benefits in using SMC as the first surface layer. For example, SMC has low density but favourable mechanical properties compared with other sheet-form polymeric materials. In particular, it has been found that the very high compressive, tensile, flexural and impact strength of SMC make it particularly suitable for use in blast-resistant and/or anti-ballistic panels, for example in resisting delamination of the surface layer and maintaining the integrity of the layered composite panel against an energy wave from an explosive blast. SMC also exhibits good thermal properties and chemical resistance. Of particular importance in the context of the present invention, resistance to fire is good. Thus, the panels of the present invention may also provide some degree of protection against the risk of fire associated with explosive blasts and certain types of ballistic materials.

The sheet form polymeric material preferably has a thickness in the range of from 0.5 to 25 mm, more preferably from 0.5 to 15 mm, still more preferably from 0.5 to 10 mm, and most preferably from 0.5 to 5 mm. For example, the sheet form polymeric material may have a thickness of 1 mm, 2 mm, 3 mm or 4 mm.

Preferably, the first surface layer of sheet-form polymeric material extends across an entire surface of the first solid open-cell foam panel.

In accordance with aspects of the invention, the first surface layer of sheet form polymeric material is desirably orientated in use towards the origin of a potential explosive blast or ballistic material.

In some aspects of the invention, the core may consist of the first solid, open-cell foam panel. In other aspects of the invention, the core may comprise more than one foam panel. In particular, in some of the foregoing embodiments of the invention, the core comprises a second foam panel bonded to the first solid open-cell foam panel by way of an adhesive or bonding agent.

Where present, the second solid foam panel may be the same as or different to the first solid open-cell foam panel. Thus, the second solid foam panel may comprise or consist of an open-cell foam or a closed-cell foam. Preferably, the second solid foam panel comprises an open-cell foam, and most preferably an open-cell polymeric foam, for example an open-cell polymeric foam as described above.

The adhesive or bonding agent used to bond the first and second foam layers preferably comprises or consists of one or more elastomers. Preferably, the adhesive or bonding agent comprises or consists of at least one elastomer selected from: natural rubber, synthetic polyisoprene, butyl rubber, halogenated butyl rubber, polybutadiene, styrene-butadiene rubber, nitrile rubber, hydrogenated nitrile rubber, chloroprene rubber, silicone rubber, and halogenated silicone rubber.

Where the adhesive or bonding agent comprises one or more elastomers, the elastomer preferably penetrates at least a portion of the first solid open-cell foam panel. For example, the elastomer may penetrate the first solid, open-cell foam panel to a depth which is at least equivalent to the average cell diameter of the foam, more preferably to a depth which is at least equivalent to two times the average cell diameter of the foam. Alternatively, the elastomer may penetrate the first solid, open-cell foam panel to a depth of at least 0.5 mm, more preferably at least 1.0 mm, and still more preferably at least 2.0 mm, for example 2.5 mm or 3.0 mm.

More preferably, where the second solid foam panel comprises an open-cell foam, the elastomer preferably penetrates at least a portion of each of the solid open-cell foam panels. For example, the elastomer may penetrate the first and/or the second solid, open-cell foam panel to a depth which is at least equivalent to the average cell diameter of the foam, more preferably to a depth which is at least equivalent to two times the average cell diameter of the foam. Alternatively, the elastomer may penetrate the first and/or the second solid, open-cell foam panel to a depth of at least 0.5 mm, more preferably at least 1.0 mm, and still more preferably at least 2.0 mm, for example 2.5 mm or 3.0 mm.

If required, the properties of each of the solid foam panels may be selected so as to optimise the blast-resistance and anti-ballistic properties of the layered composite panels. For example, the first solid, open-cell foam panel may have a resistance to deformation (e.g. crushing, collapse, or fragmentation) that is lower than the second solid foam panel. In this way, the layered composite panel may have a progressive resistance to deformation that increase from one solid foam panel to the next. The difference in resistance to deformation between the solid foam panels may be due to a difference in density. Other arrangements are of course possible, as will be appreciated by persons of skill in the art.

It has been found that these constructions provide blast-resistant and anti-ballistic panels which are extremely strong, highly resistant to delamination and fragmentation of the core layers under the impact of an explosive energy wave, and which provide exceptional protection from explosive blasts and ballistic materials.

In further aspects of the invention, the core may comprise one or more further core layers. In this way, the core may be formed from a plurality of layers or plies, wherein the plurality of layers or plies are preferably bonded together so as to form a monolithic core structure.

Preferably the plurality of layers or plies are coextensive with one another. However, it is not excluded that in certain embodiments of the invention, the various layers or plies of the core may differ in extent. For example, one or more further core layers may be used only in areas of particular vulnerability to explosive impact, or to provide structural reinforcement in areas of the panel subjected to increased mechanical stress (e.g. at or around joints).

In some embodiments, the core comprises one or more further solid foam panels, which may be the same or different to the first solid, open-cell foam panel and/or the second solid foam panel (where present). Thus, the one or more additional solid foam panels may comprise or consist of an open-cell or closed-cell foam. Preferably, the one or more additional solid foam panels comprise an open-cell foam, and most preferably an open-cell polymeric foam, for example an open-cell polymeric foam as described above.

In accordance with this aspect of the invention, the properties of each of the solid foam panels may be selected so as to optimise the blast-resistance and anti-ballistic properties of the layered composite panels. For example, the first solid, open-cell foam panel may have a resistance to deformation (e.g. crushing, collapse, or fragmentation) that is lower than a second solid foam panel. In this way, the layered composite panel may have a progressive resistance to deformation that increase from one solid foam panel to the next. Other arrangements are of course possible, as will be appreciated by persons of skill in the art.

In an embodiment, the composite panel comprises three solid foam panels. Preferably, the two outer panels sandwich an inner panel. Preferably, the inner panel has a lower resistance to deformation than the outer panels, for example by having a lower density. Preferably, the inner solid foam panel may have a density of 100 to 140 kg·m$^{-3}$, and the outer solid foam panels may have a density of 130 to 170 kg·m$^{-3}$. More preferably, the inner solid foam panel has a density of 115 to 125 kg·m$^{-3}$, and the outer solid foam panels may have a density of 145 to 155 kg·m$^{-3}$. It is believed that, under large or repeated impact, the inner panel absorbs at least a portion of the impact energy and thus deforms, for example by being frangible, whilst the outer panels remain substantially intact.

In another embodiment, the composite material may comprise more than three solid foam panels in a sandwich like structure. Preferably, one or more of the inner solid foam panels has a lower resistance to deformation than its respective outer panels. Preferably, one or more of the inner solid foam panels may have a density of 100 to 140 kg·m$^{-3}$, and the outer solid foam panels may have a density of 130 to 170 kg·m$^{-3}$. More preferably, one or more of the inner solid foam panels has a density of 115 to 125 kg·m$^{-3}$, and the outer solid foam panels may have a density of 145 to 155 kg·m$^{-3}$. In all of the embodiments where the composite material comprises a plurality of layers or plies, the outer panels may be the same or different from one another.

The one or more further solid foam panels may be bonded directly to one another so as to form a monolithic core structure, or may be bonded together through one or more intermediate layers.

Where the core comprises one or more further solid foam panels, such as one or more additional solid, open-cell foam panels, any two of the panels may be bonded together by way of an adhesive or other bonding agent. The adhesive or bonding agent preferably comprises or consists of one or more elastomers as described above. The elastomer may penetrate one or more of the foam panels as described above.

Thus, in one particularly preferred embodiment, the core comprises the first solid open-cell foam panel and a second solid-open-cell foam panel, which may be the same as or different from the first, wherein the panels are joined together by an adhesive or bonding agent which comprises one or more elastomers, and wherein the elastomer penetrates the solid open-cell foam panels as described above.

In another particularly preferred embodiment, the core comprises the first, second and third solid open-cell foam panels, which may each be the same or different, wherein the panels are joined together by an adhesive or bonding agent which comprises one or more elastomers, and wherein the elastomer penetrates the solid open-cell foam panels as described above.

In some embodiments, the core may further comprise one or more reinforcing layers.

One type of reinforcing layer suitable for the layered composite panels described above comprises reinforcing fibres. The fibres may include one or more materials. For example, the fibres may include one or more of carbon fibres, glass fibres, aramid fibres and/or polyethylene fibres, such as ultra-high molecular weight polyethylene (UHMWPE) fibres. In one preferred embodiment, the reinforcement comprises or consists of glass fibres, for example E-glass fibres and/or S-glass fibres.

Preferably, the reinforcing fibres used in the one or more reinforcing layers are in the form of a woven or orientated fabric, felt, mat or web, which may be formed in any suitable manner as known in the art.

The reinforcing layer comprising reinforcing fibres in the form of a woven or orientated fabric, felt, mat or web is preferably penetrable by a curable material or by an adhesive. In this way, the reinforcing layer may be used as an intermediate layer between the first surface layer of a sheet form cured polymeric material and the first solid, open-cell foam panel, such that cured polymeric material preferably penetrates the reinforcing layer and a surface of the open-cell foam panel, thus forming a bond between the first surface layer and the core, with the reinforcing layer embedded in cured polymeric material.

In another example, the reinforcing layer may be used as an intermediate layer between two adjacent foam panels in the core, wherein the reinforcing layers is embedded in the adhesive or bonding agent (e.g. containing an elastomer) that is used to bond the foam panels together as described above.

The core may further comprise one or more layers of sheet form polymeric material as described above. In a preferred embodiment, the sheet form polymeric material may comprise a cured polymeric material which penetrates the surface of at least one adjacent solid open-cell foam panel. More preferably, the sheet form polymeric material may comprise a cured polymeric material which penetrates the surface of two adjacent solid open-cell foam panels, so as to bond the panels together.

The core may further comprise one or more other types of blast-resistant and/or anti-ballistic materials. A range of suitable materials are known in the art which can readily be incorporated into the layered composite materials described above. For example, suitable additional layers could be selected from glass reinforced plastic (GRP) panels, ceramic panels, ceramic-reinforced plastic panels, steel panels, or similar.

The core may further comprise one or more fire-retardant layers. Examples of materials which may be incorporated into the one or more fire-retardant layers include rock wool, gypsum, perlite, vermiculite, alumina, aluminium hydroxide, magnesium hydroxide, and calcium silicate.

In accordance with aspects of the present invention, the core preferably has a thickness in the range of from 20 to 500 mm, more preferably 20 to 250 mm, still more preferably from 20 to 200 mm, still more preferably from 20 to 150 mm, still more preferably from 20 to 100 mm, and most preferably from 50 to 100 mm. For example, the core may have a thickness of at least 25 mm, at least 40 mm, or at least 50 mm.

In preferred aspects of the invention, the layered composite panel further comprises (iii) a second surface layer of a sheet form polymeric material, wherein the core is disposed between the first and second surface layers of sheet-form polymeric material, such that the resulting layered composite panel has a sandwich construction—the core being sandwiched between first and second surface layers of sheet-form polymeric material.

The first and second surface layers of sheet-form polymeric material may be the same or different. Preferably, the second surface layer of sheet-form polymeric material comprises a thermosetting polymer matrix as defined above, and/or preferably comprises reinforcement as described above. In a preferred embodiment the first and second surface layers of sheet-form polymeric material consist of SMC as defined above. Where the second layer of sheet form polymeric material comprises a cured polymeric material, a portion of the curable material preferably penetrates the surface of an open-cell foam panel forming a bond between the second surface layer and the core.

Where the core consists of a first solid, open-cell foam panel, the second surface layer of sheet-form polymeric material is bonded to a surface of the solid, open-cell foam panel opposite the first surface layer of sheet-form polymeric material.

Where the core comprises two or more layers and/or panels, the second surface layer of sheet-form polymeric material is bonded to a surface of the core opposite the first surface layer of sheet-form polymeric material. Preferably, the core comprises a solid foam layer adjacent to the second surface layer of sheet-form polymeric material. More preferably, the core comprises a solid, open-cell foam layer adjacent to the second surface layer of sheet-form polymeric material.

Alternatively, the second surface layer of sheet-form polymeric material may be bonded to the core by way of an adhesive or other bonding agent.

A reinforcing layer comprising reinforcing fibres, for example in the form of a woven or orientated fabric, felt, mat or web, may optionally be disposed between the second surface layer of sheet-form material and the core.

In accordance with aspects of the present invention, the layered composite panel preferably has a thickness in the range of from 21 to 550 mm, more preferably 21 to 275 mm, still more preferably from 21 to 220 mm, still more preferably from 21 to 165 mm, still more preferably from 21 to 110 mm, and most preferably from 51 to 110 mm. For example, the layered composite panel may have a thickness of at least 26 mm, at least 41 mm, or at least 51 mm.

In accordance with aspects of the present invention, the layered composite panel is preferably capable of withstanding an energy wave having an impulse of at least 20 $psi \cdot ms^{-1}$. In some embodiments of the invention, the layered composite panel is capable of withstanding an energy wave having an impulse of at least 50 $psi \cdot ms^{-1}$, more preferably at least 100 $psi \cdot ms^{-1}$, more preferably at least 150 $psi \cdot ms^{-1}$, still more preferably at least 200 $psi \cdot ms^{-1}$, and most preferably 250 $psi \cdot ms^{-1}$. By "withstanding", it is meant that the layered composite material remains intact, without fragmentation and/or delamination of the surface layer of sheet-form polymeric material, and that the impulse transmitted through the layered composite material is reduced to no more than 20% of the impulse of the energy wave before the panel, preferably no more than 10%, still more preferably no more than 5%, and most preferably no more than 2% of the impulse of the energy wave before the panel.

It will be appreciated that other arrangements of layers are possible within the scope of the present invention. For instance, the layered composite material may include one or more further layers of sheet-form polymeric material, one or more further reinforcing layers, one or more further foam layers, and/or one or more further fire-retardant layers.

The component layers or panels of the layered composite panel may be assembled in a variety of ways. Thus, the layers may be bonded together simultaneously or consecutively. Where the layers are bonded together consecutively, the order in which the layers are bonded together is not limited.

In a preferred example, the layered composite panel may be formed by a method that comprises the steps of layering a sheet-form curable material (e.g. SMC) and at least the first solid, open-cell foam panel in a press and applying heat and/or pressure to the layers to cure the sheet-form material, thus forming a bond to the solid open-cell foam. Preferably, at least a portion of the material of the sheet-form curable material flows into the cells or interstices of the first solid, open-cell foam panel during the curing step.

The resulting composite may optionally be bonded to one or more additional core layers and/or a second surface layer of sheet-form polymeric material in one or more subsequent manufacturing steps. Alternatively, or in addition, the solid open-cell foam panel may be bonded to one or more additional core component layers or panels prior to the curing step.

In a further example, the method may comprise the steps of layering a sheet-form curable polymeric material, a core (e.g. consisting of the first solid open-cell foam panel, or a plurality of core panels/layers), and a second layer of sheet-form curable polymeric material in a press and applying heat and/or pressure to the layers. In this way, the first and second surface layers of sheet-form polymeric material may be bonded to the core in a single step.

In a preferred embodiment, one or both faces of the layered composite panel may have a profiled surface. For example, one or both faces of the layered composite panel may have a profiled surface formed by a moulding technique. Where a profiled surface is used, it is preferably formed on a surface which is visible when the layered composite panel is in use. For example, the profile may be formed on the first surface layer. In this way, the aesthetic effect of the layered composite panels of the invention may be improved, and the function of the panels may be disguised for aesthetic and security reasons.

In a preferred embodiment, the profiled surface may be formed by a method as described above, wherein the press is provided with a mould surface having a negative impression of the desired profile.

In particular, the method preferably comprises the steps of: (i) providing a mould surface having a negative impression of the desired profile; (ii) layering a sheet-form curable polymeric material (e.g. SMC) over the surface of the mould; (iii) providing a core (e.g. consisting of the first solid open-cell foam panel, or a plurality of core panels/layers) over the sheet-form curable polymeric material; and (iv) optionally providing a second surface layer of a sheet-form polymeric material (e.g. SMC) over the core; and (v) pressing the layers into the mould, optionally with heating.

Upon pressing the layers into the mould, air is expelled from the first solid, open-cell foam panel, and some cells of the foam are preferably crushed, so as to allow the foam to assume the shape of the mould and thereby press the sheet-form polymeric material into the mould.

The first solid open-cell foam panel may optionally be bonded to one or more additional core layers/panels prior to the moulding step. Alternatively, bonding between the first solid, open-cell foam panel and one or more additional core layers/panels and/or a second surface layers of a sheet form polymeric material may take place during one or more subsequent steps. In a further possibility, one or more additional core layers and/or a second surface layer of a sheet-form polymeric material may also be bonded together in the pressing step (e.g. where the second surface layer of a sheet-form polymeric material comprises a curable material).

Optionally, a second mould surface may be provided over the second layer of sheet-form polymeric material, such that a layered composite panel is provided having a profiled surface on both faces.

Where the layered composite panel has a profiled surface formed by moulding, the first and/or second layers of sheet-from polymeric material are preferably formed from a sheet-form curable polymeric material, such as SMC. Preferably, the sheet-form polymeric material layer is adjacent to a solid open-cell foam panel, such as a solid open-cell phenolic resin foam panel.

In some examples, an outer surface of the sheet-form polymeric material may optionally be bonded to a surface effect material. The surface effect material may be selected so as to provide the layered composite panel with, for example, a simulated stone surface, a simulated brick surface, a simulated wood surface, a wood laminate surface, a material of high thermal conductivity (a "cool touch" surface), or a reflective surface. For example, a granular material, such as sand or metal granules, a veneer element, such as a wood veneer element, a brick veneer element, a stone veneer element, or a metallic foil/metallic particles can be bonded to, or partially embedded into the surface of the sheet form polymeric material. Different surface effects can be obtained by selection of the types of surface effect materials that are used.

To improve the rigidity of the layered composite panels used according to the invention, the layered composite panels may be mounted in a frame or by frame members such as stiles, rails, and/or mullions. The frame members may be of wood, metal (for example, aluminium), or plastics (such as UPVC), or a combination of these.

In one embodiment, the layered composite panels of the invention may occupy substantially the entire volume or volume within the frame, such that frame members abut the edges of the layered composite panels. In another embodiment, substantially the entire volume or volumes within the frame are occupied by the core, and the first and/or second surface layers of a sheet form polymeric material overlie substantially the entire surface of the frame and the layers contained therein. It will be appreciated that the use of frame members, particularly metal frame members, may compromise the blast resistance of the layered composite panels of the invention. Thus, the use of frame members is ideally kept to the minimum necessary to obtain the necessary structural rigidity of the layered composite panels of the invention.

The layered composite panels of the invention may be formed in a large surface area, or continuous configuration, and subsequently cut to the required size. Alternatively, the layered composite panels may be custom fabricated with the required dimensions for a particular application.

In one embodiment, the composite materials of the invention may be provided in the form of modular panels, wherein each panel is provided with interconnecting means to allow a series of panels to be interconnected. In a preferred embodiment, the interconnecting means is a tongue and groove arrangement.

Where the core comprises more than three layers or panels, the tongue and groove arrangement may be obtained by offsetting one or more central layers or panels relative to two or more outer layers. The offset may be linear or diagonal. Where the offset is linear, the layered composite panels may be connected in a two-dimensional array. Where the offset is diagonal, the layered composite panels may be connected in a three-dimensional array.

Alternatively, or where the core comprises fewer than three layers, the tongue and groove arrangement may be obtained by contouring the edges of the individual layers of the core. Where the tongue and groove arrangement is provided on two opposite edges of the layered composite panels, the panels may be connected in a two-dimensional array. Where the tongue and groove arrangement is provided on all edges of the layered composite panels, the panels may be connected in a three-dimensional array.

Where a tongue and groove arrangement is used, the tongue and/or groove portions may comprise means for maintaining the integrity of the tongue and groove joint. For example, the tongue and/or groove portions may be provided with a gripping surface, such as a rubberised coating. Alternatively, the tongue and/or groove portions may be provided with an adhesive prior to joining the panels.

In some aspects of the present invention, the layered composite panel may be used in conjunction with a reinforced webbing material, such as a poly-aramid webbing or a UHMWPE webbing material. Such webbing materials are well-known in the art and are used, for example, to prevent fragmentation and/or the release of high velocity fragments from the rear surface of walls when exposed to the energy wave from an explosive blast.

Such webbing materials may provide further attenuation of the effects of an explosive blast. Preferably the webbing materials are bonded to or positioned across a rear surface of the layered composite panel, i.e. a surface opposite the surface that faces the potential origin of an explosive blast or ballistic material.

In accordance with the present invention, the composite material panels may be used to form a blast-resistant and/or anti-ballistic envelope around persons or infrastructure that are at risk of damage or injury from an explosive blast or high-velocity fragments. Thus, for example, the composite material panels may be used to reinforce existing structures, such as buildings or vehicles, for example as cladding. In some examples, the composite material panels may be spaced apart from an existing structure, or may be fixed directly to the existing structure.

In other examples, the composite material panels may be used as construction materials in their own right without any internal pre-existing structure. In a particularly preferred embodiment, the composite materials may be mounted in a frame, e.g. a steel frame, to form a wall or building. For example, the composite materials may be prefabricated in modular form, allowing rapid construction of walls and/or buildings in situ. In one preferred embodiment, the composite material panels may be mounted using expansion clips of a type known in the art. These clips can expand in response to an explosive energy wave contacting the composite material panels, so as to further assist in absorbing the energy of the explosion.

As noted above, in aspects of the present invention, a particularly suitable solid open-cell foam is a solid open-cell phenolic resin foam. For example, a suitable foam may be produced by way of a curing reaction between:
  (a) a liquid phenolic resole having a reactivity number (as defined below) of at least 1; and
  (b) a strong acid hardener for the resole; optionally in the presence of:
  (c) a finely divided inert and insoluble particulate solid which is present, where used, in an amount of at least 5% by weight of the liquid resole and is substantially uniformly dispersed through the mixture containing resole and hardener;
the temperature of the mixture containing resole and hardener due to applied heat not exceeding 85° C. and the said temperature and the concentration of the acid hardener being such that compounds generated as by-products of the curing reaction are volatilised within the mixture before the mixture sets such that a foamed phenolic resin product is produced.

By a phenolic resole is meant a solution in a suitable solvent of an acid-curable prepolymer composition prepared by condensation of at least one phenolic compound with at least one aldehyde, usually in the presence of an alkaline catalyst such as sodium hydroxide.

Examples of phenols that may be employed are phenol itself and substituted, usually alkyl substituted, derivatives thereof, with the condition that the three positions on the phenolic benzene ring ortho- and para- to the phenolic hydroxyl group are unsubstituted. Mixtures of such phenols may also be used. Mixtures of one or more than one of such phenols with substituted phenols in which one of the ortho- or para-positions has been substituted may also be employed where an improvement in the flow characteristics of the resole is required. However, in this case the degree of cross-linking of the cured phenolic resin foam will be reduced. Phenol itself is generally preferred as the phenol component for economic reasons.

The aldehyde will generally be formaldehyde although the use of higher molecular weight aldehydes is not excluded.

The phenol/aldehyde condensation product component of the resole is suitably formed by reaction of the phenol with at least 1 mole of formaldehyde per mole of the phenol, the formaldehyde being generally provided as a solution in water, e.g. as formalin. It is preferred to use a molar ratio of formaldehyde to phenol of at least 1.25 to 1 but ratios above 2.5 to 1 are preferably avoided. The most preferred range is 1.4 to 2.0 to 1.

The mixture may also contain a compound having two active hydrogen atoms (dihydric compound) that will react with the phenol/aldehyde reaction product of the resole during the curing step to reduce the density of cross-linking. Preferred dihydric compounds are diols, especially alkylene diols or diols in which the chain of atoms between the hydroxy groups contains not only methylene and/or alkyl-substituted methylene groups but also one or more heteroatoms, especially oxygen atoms. Suitable diols include ethylene glycol, propylene glycol, propane-1,3-diol, butane-1,4-diol and neopentyl glycol. Particularly preferred diols are poly-, especially di-, (alkylene ether) diols, for example diethylene glycol and, especially, dipropylene glycol.

Preferably the dihydric compound is present in an amount of from 0 to 35% by weight, more preferably 0 to 25% by weight, based on the weight of phenol/aldehyde condensation product. Most preferably, the dihydric compound, when used, is present in an amount of from 5 to 15% by weight based on the weight of phenol/aldehyde condensation product. When such resoles containing dihydric compounds are employed in the present process, products having a particularly good combination of physical properties, especially strength, can be obtained.

Suitably, the dihydric compound is added to the formed resole and preferably has 2 to 6 atoms between hydroxy groups.

The resole may comprise a solution of the phenol/aldehyde reaction product in water or in any other suitable solvent or in a solvent mixture, which may or may not include water.

Where water is used as the sole solvent, it is preferably present in an amount of from 15 20 to 35% by weight of the resole, preferably 20 to 30%. Of course the water content may be substantially less if it is used in conjunction with a cosolvent, e.g. an alcohol or one of the above-mentioned dihydric compounds where used.

As indicated above, the liquid resole (i.e. the solution of phenol/aldehyde product 25 optionally containing dihydric compound) must have a reactivity number of at least 1. The reactivity number is 10/x where x is the time in minutes required to harden the resole using 10% by weight of the resole of a 66 to 67% aqueous solution of p-toluene sulfonic acid at 60° C. The test involves mixing about 5 mL of the resole with the stated amount of the p-toluene sulfonic acid solution in a test tube, immersing the test tube in a water bath heated to 60° C. and measuring the time required for the mixture to become hard to the touch. The resole should have a reactivity number of at least 1 for useful foamed products to be produced and preferably the resole has a reactivity number of at least 5, most preferably at least 10.

The pH of the resole, which is generally alkaline, is preferably adjusted to about 7, if necessary, for use in the process, suitably by the addition of a weak organic acid such as lactic acid.

Examples of strong acid hardeners are inorganic acids such as hydrochloric acid, sulphuric acid and phosphoric acid, and strong organic acids such as aromatic sulphonic acids, e.g. toluene sulphonic acids, and trichloroacetic acid. Weak acids such as acetic acid and propionic acid are generally not suitable. The preferred hardeners for the process of the invention are the aromatic sulfonic acids, especially toluene sulfonic acids. The acid may be used as a solution in a suitable solvent such as water.

When the mixture of resole, hardener and solid is to be poured, e.g. into a mould and in slush moulding applications, the amount of inert solid that can be added to the resole and hardener is determined by the viscosity of the mixture of resole and hardener in the absence of the solid. For these applications, it is preferred that the hardener is provided in a form, e.g. solution, such that when mixed with the resole in the required amount yields a liquid having an apparent viscosity not exceeding about 50 poises at the temperature at which the mixture is to be used, and the preferred range is 5 to 20 poises. Below 5 poises, the amount of solvent present tends to present difficulties during the curing reaction.

The curing reaction is exothermic and will therefore of itself cause the temperature of the mixture containing resole and acid hardener to increase. The temperature of the mixture may also be raised by applied heat, but the temperature to which said mixture may then be raised (that is, excluding the effect of any exotherm) preferably does not exceed 85° C. If the temperature of the mixture exceeds 85° C. before addition of the hardener, it is usually difficult or impossible thereafter to properly disperse the hardener through the mixture because of incipient curing. On the other hand, it is difficult, if not impossible, to uniformly heat the mixture above 85° C. after addition of the hardener.

Increasing the temperature towards 85° C. tends to lead to coarseness and non-uniformity of the texture of the foam but this can be offset at least to some extent at moderate temperatures by reducing the concentration of hardener. However at temperatures much above 75° C. even the minimum amount of hardener required to cause the composition to set is generally too much to avoid these disadvantages. Thus, temperatures above 75° C. are preferably avoided and preferred temperatures for most applications are from ambient temperature to about 75° C. The preferred temperature range usually depends to some extent on the nature of the particulate solid, where used. For most solids the preferred temperature range is from 25 to 65° C., but for some solids, in particular wood flour and grain flour, the preferred temperature range is 25 to 75° C. The most preferred temperature range is 30 to 50° C. Temperatures below ambient, e.g. down to 10° C. can be used if desired, but no advantage is usually gained thereby. In general, at temperatures up to 75° C., increase in temperature leads to decrease in the density of the foam and vice versa.

The amount of hardener present also affects the nature of the product as well as the rate of hardening. Thus, increasing the amount of hardener not only has the effect of reducing the time required to harden the composition, but above a certain level dependant on the temperature and nature of the resole it also tends to produce a less uniform cell structure. It also tends to increase the density of the foam because of the increase in the rate of hardening. In fact, if too high a concentration of hardener is used, the rate of hardening may be so rapid that no foaming occurs at all and under some conditions the reaction can become explosive because of the build up of gas inside a hardened shell of resin. The appropriate amount of hardener will depend primarily on the temperature of the mixture of resole and hardener prior to the commencement of the exothermic curing reaction and the reactivity number of the resole and will vary inversely with the chosen temperature and the reactivity number. The preferred range of hardener concentration is the equivalent of 2 to 20 parts by weight of p-toluene sulfonic acid per 100 parts by weight of phenol/aldehyde reaction product in the resole, assuming that the resole has a substantially neutral reaction, i.e. a pH of about 7. By equivalent to p-toluene sulfonic acid, we mean the amount of hardener required to give substantially the same curing time as the stated amount of p-toluene sulfonic acid. The most suitable amount for any given temperature and combination of resole and finely divided solid is readily determinable by simple experiment. Where the preferred temperature range is 25 to 75° C. and the resole has a reactivity number of at least 10, the best results are generally obtained with the use of hardener in amounts equivalent to 3 to 10 parts of p-toluene sulfonic acid per 100 parts by weight of the phenol/aldehyde reaction product. For use with temperatures below 25° C. or resoles having a reactivity number below 10, it may be necessary to use more hardener.

By suitable control of the temperature and of the hardener concentration, the time lapse between adding the hardener to the resole and the composition becoming hard (referred to herein as the curing time) can be varied at will from a few seconds to up to an hour or even more, without substantially affecting the density and cell structure of the product.

Another factor that controls the amount of hardener required can be the nature of the inert solid, where present. Very few are exactly neutral and if the solid has an alkaline reaction, even if only very slight, more hardener may be required because of the tendency of the filler to neutralize it. It is therefore to be understood that the preferred values for hardener concentration given above do not take into account any such effect of the solid. Any adjustment required because of the nature of the solid will depend on the amount of solid used and can be determined by simple experiment.

The exothermic curing reaction of the resole and acid hardener leads to the formation of by-products, particularly aldehyde and water, which are at least partially volatilised.

The curing reaction is effected in the presence of a finely divided inert and insoluble particulate solid which is substantially uniformly dispersed throughout the mixture of resole and hardener. By an inert solid we mean that in the quantity it is used it does not prevent the curing reaction.

It is believed that the finely divided particulate solid provides nuclei for the gas bubbles formed by the volatilisation of the small molecules, primarily formaldehyde and/or water, present in the resole and/or generated by the curing action, and provides sites at which bubble formation is promoted, thereby assisting uniformity of pore size. The presence of the finely divided solid may also promote stabilisation of the individual bubbles and reduce the tendency of bubbles to agglomerate and eventually cause likelihood of bubble collapse prior to cure. To achieve the desired effect, the solid should be present in an amount of not less than 5% by weight based on the weight of the resole.

Any finely divided particulate solid that is insoluble in the reaction mixture is suitable, provided it is inert. Examples of suitable particulate solids are provided above.

Solids having more than a slightly alkaline reaction, e.g. silicates and carbonates of alkali metals, are preferably avoided because of their tendency to react with the acid hardener. Solids such as talc, however, which have a very mild alkaline reaction, in some cases because of contamination with more strongly alkaline materials such as magnesite, are acceptable.

Some materials, especially fibrous materials such as wood flour, can be absorbent and it may therefore be necessary to use generally larger amounts of these materials than non-fibrous materials, to achieve valuable foamed products.

The solids preferably have a particle size in the range 0.5 to 800 microns. If the particle size is too great, the cell structure of the foam tends to become undesirably coarse. On the other hand, at very small particle sizes, the foams obtained tend to be rather dense. The preferred range is 1 to 100 microns, most preferably 2 to 40 microns. Uniformity of cell structure appears to be encouraged by uniformity of particle size. Mixtures of solids may be used if desired.

If desired, solids such as finely divided metal powders may be included which contribute to the volume of gas or vapour generated during the process. If used alone, however, it will be understood that the residues they leave after the gas by decomposition or chemical reaction satisfy the requirements of the inert and insoluble finely divided particulate solid required by the process of the invention.

Preferably, the finely divided solid has a density that is not greatly different from that of the resole, so as to reduce the possibility of the finely divided solid tending to accumulate towards the bottom of the mixture after mixing.

One preferred class of solids is the hydraulic cements, e.g. gypsum and plaster, but not Portland cement because of its alkalinity. These solids will tend to react with water present in the reaction mixture to produce a hardened skeletal structure within the cured resin product. Moreover, the reaction with the water is also exothermic and assists in the foaming and curing reaction. Foamed products obtained using these materials have particularly valuable physical properties. Moreover, when exposed to flame even for long periods of time they tend to char to a brick-like consistency that is still strong and capable of supporting loads. The products also have excellent thermal insulation and energy absorption properties. The preferred amount of inert particulate solid is from 20 to 200 parts by weight per 100 parts by weight of resole.

Another class of solids that is preferred because its use yields products having properties similar to those obtained using hydraulic cements comprises talc and fly ash. The preferred amounts of these solids are also 20 to 200 parts by weight per 100 parts by weight of resole.

For the above classes of solid, the most preferred range is 50 to 150 parts per 100 parts of resole.

In general, the maximum amount of solid that can be employed is controlled only by the physical problem of incorporating it into the mixture and handling the mixture. In general it is desired that the mixture is pourable but even at quite high solids concentrations, when the mixture is like a dough or paste and cannot be poured, foamed products with valuable properties can be obtained.

Other additives may be included in the foam-forming mixture. These may include: (i) surfactants, such as anionic materials, e.g. sodium salts of long chain alkyl benzene sulfonic acids, non-ionic materials such as those based on poly(ethyleneoxide) or copolymers thereof, and cationic materials such as long chain quaternary ammonium compounds or those based on polyacrylamides; (ii) viscosity modifiers such as alkyl cellulose, especially methyl cellulose; and (iii) colorants, such as dyes or pigments. Plasticisers for phenolic resins may also be included provided the curing and foaming reactions are not suppressed thereby, and polyfunctional compounds other than the dihydric compounds referred to above may be included which take part in the cross-linking reaction which occurs in curing; e.g. di- or poly-amines, di- or poly-isocyanates, di- or poly-carboxylic acids and aminoalcohols. Polymerisable unsaturated compounds may also be included, possibly together with free-radical polymerisation initiators that are activated during the curing reaction, e.g. acrylic monomers, so-called urethane acrylates, styrene, maleic acid and derivatives thereof, and mixtures thereof. The foam-forming compositions may also contain dehydrators, if desired.

Other resins may be included e.g. as prepolymers which are cured during the foaming and curing reaction or as powders, emulsions or dispersions. Examples are polyacetals such as polyvinyl acetals, vinyl polymers, olefin polymers, polyesters, acrylic polymers and styrene polymers, polyurethanes and prepolymers thereof and polyester prepolymers, as well as melamine resins, phenolic novolaks, etc. Conventional blowing agents may also be included to enhance the foaming reaction, e.g. low boiling organic compounds or compounds which decompose or react to produce gases.

The SMC may be prepared by applying a layer of a resin paste, for example a polyester resin paste, containing additives where appropriate, onto a bottom film carrier. Glass fibres as the reinforcement are then applied to the upper surface of the resin paste on the film carrier. A further layer of the resin paste is applied to sandwich the fibres between the layers of matrix. A top film is applied to the upper layer of the matrix. The resulting layered composition is subsequently compressed using a series of rollers to form a sheet of the SMC between the film carriers. The material is rolled onto rollers and kept for at least 3 days at a regulated temperature of for example 23 to 27° C. The resulting SMC can be compression moulded with heat. The shelf life of the SMC before use is usually a few weeks.

Preferred features of the present invention will now be described, purely by way of example, with reference to the accompanying drawings, in which.

Figure 1:
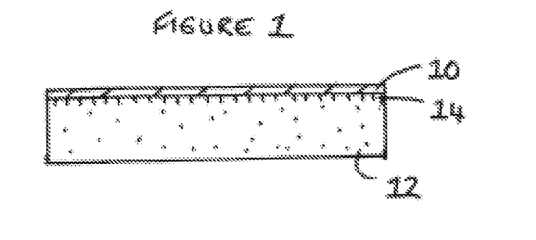
FIGS. 1 to 5 show a schematic cross-sectional view of various embodiments of the layered composite panels of the invention (not drawn to scale).

In FIG. 1, a layered composite panel is shown having a first surface layer of a sheet form polymeric material (10) bonded to a first solid open-cell foam panel (12), wherein a cured polymeric material (14) penetrates a surface of the first solid open-cell foam panel (12).

Figure 2:
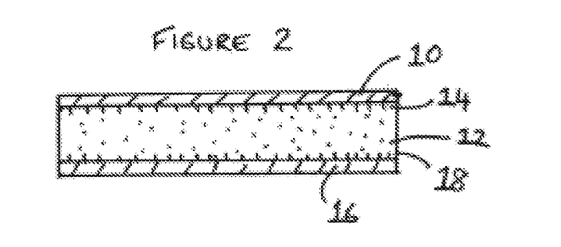

In FIG. 2, a second surface layer of a sheet form polymeric material (16) is also bonded to the first solid open-cell foam panel. Again, a cured polymeric material (18) penetrates a surface of the first solid open-cell foam panel (12).

Figure 3:
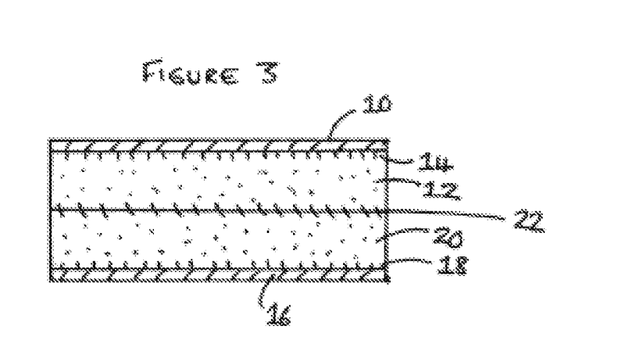

In FIG. 3, the core comprises first and second solid open-cell foam panels (12, 20) respectively bonded to first and second surface layers of sheet form polymeric material (10, 16). A cured polymeric material (14, 18) penetrates a surface of each of the first and second solid open-cell foam panels (12, 20), and an elastomeric adhesive (22) bonds the first and second solid open-cell foam panels together. As shown, the elastomeric adhesive penetrates a portion of each of the first and second solid open-cell foam panels.

Figure 4:
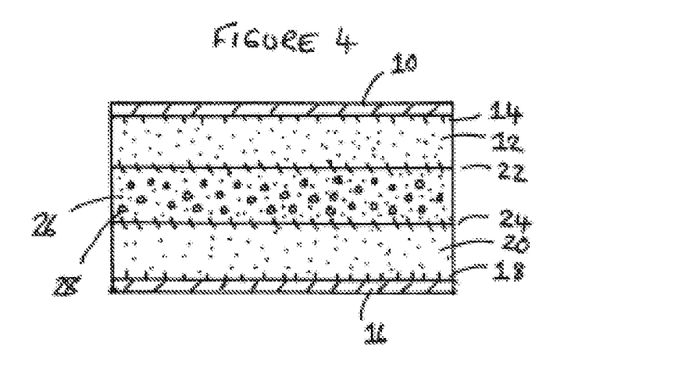

In FIG. 4, a third solid open-cell foam panel (26) is provided between the first and second solid open-cell foam panels (12, 20). An elastomeric adhesive (22, 24) bonds the first, second and third solid open-cell foam panels together, and penetrates a portion of each of the foam panels. As shown, the third solid open-cell foam panel comprises chips (28) of stone, ceramic, glass or other aggregate materials embedded in the solid open-cell foam matrix.

Figure 5:
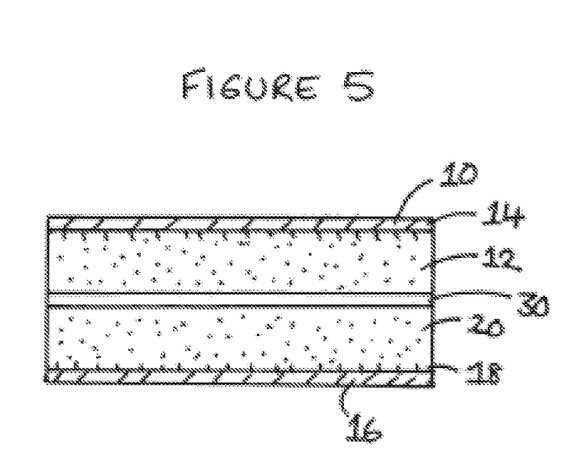

In FIG. 5, a reinforcing panel (30), such as a glass-reinforced plastics material, is provided between the first and second solid open-cell foam panels (12, 20).

Figure 6A:
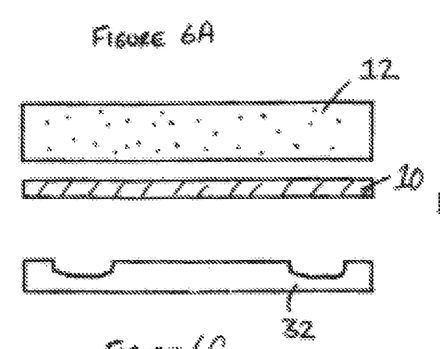
FIG. 6A shows schematically in cross-sectional exploded view the moulding of a layered composite panel of the invention having a profiled surface (not drawn to scale).
Figure 6B:
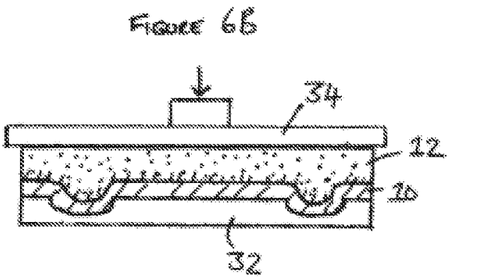
FIG. 6B shows schematically in cross-sectional view the moulding of a layered composite panel of the invention having a profiled surface (not drawn to scale).
Figure 6C:
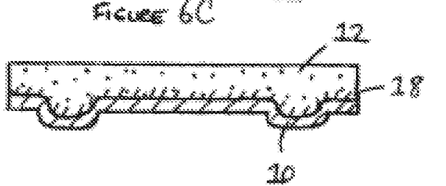
FIG. 6C shows schematically in cross-sectional view a moulded layered composite panel of the invention having a profiled surface (not drawn to scale).

As shown in FIGS. 6A to 6C, a profiled surface of the layered composite panels of the invention may be formed by a moulding process.

Thus, a layer of sheet form polymeric material (10), preferably SMC, is applied to the upper surface of a mould (32). The sheet-form polymeric material (10) is preferably sized so as to extend across the whole of the mould surface. Onto the sheet form polymeric material (10) is applied a solid open-cell foam panel (12). The foam used is advantageously:
  structural and has load bearing properties;
  frangible and can be formed under pressure;
  inelastic, such that it substantially retains its pressed form; and
  open cell such that gases may escape from the foam matrix during pressing and such that curable materials in the sheet form polymeric material can migrate into the open cells of the foam so as to form a strong bond between the sheet form polymeric material and the foam.

Downward pressure is applied to the components as shown in FIG. 6B using a pressure plate (34). Preferably, the layers are also heated. The foam layer (12) is pressed toward the lower mould surface (32), crushing the foam and moulding the lower surface of the foam (12) to the shape of the mould surface (32). The sheet form polymeric material (10) is also pressed between the mould surface (32) and the foam layer (12). Preferably, the sheet form polymeric material is heated so as to cure the polymeric material.

Air and other gases trapped between the sheet form polymeric material (10) and the foam layer (12) pass through the open cell structure of the foam. The components are held in the mould with the application of pressure and heat for a sufficient time for the formation of a bond between the layers, e.g. the curing time of the SMC. The resulting product is then removed from the mould as shown in FIG. 6C, and may subsequently be bonded to a first insulating layer as described above.

Figure 7A:
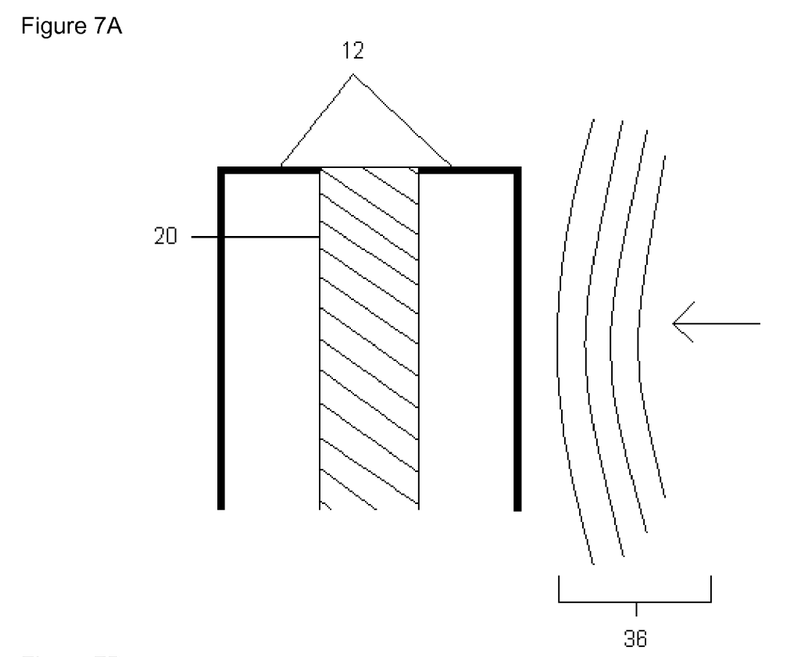
FIG. 7A shows schematically in cross-sectional view a layered composite panel of the invention before impact (not drawn to scale).
Figure 7B:
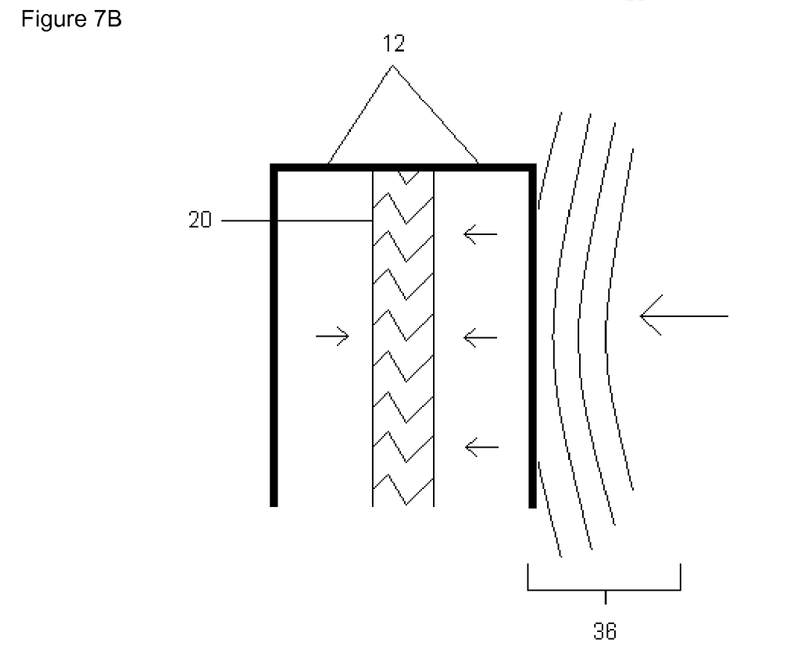
FIG. 7B shows schematically in cross-sectional view the effect of an impact on a layered composite panel of the invention (not drawn to scale).

In FIGS. 7A and 7B, a layered composite panel is shown having two first solid open-cell foam panels (12) sandwiching a lower density second solid open-cell foam panel (20). An energy wave (36) is shown approaching the composite panel in FIG. 7A, and impacting on the composite panel in FIG. 7B. As shown in FIG. 7B, the impact compresses the lower density second solid open-cell foam panel. The first solid open-cell foam panel remains intact.

EXAMPLES

Example 1

A blast resistant panel was constructed from a core consisting of a single solid open-cell phenolic resin foam panel (82 mm thickness), a first surface layer of SMC (1.5 mm) and a second surface layer of SMC (1.5 mm). A layer of orientated glass fibre fabric (1 mm) was provided between the phenolic resin foam panel and the first surface layer of SMC. The constituent layers of the blast-resistant panel were assembled and heated and pressed to cure the SMC, such that a curable material from the first surface layer of SMC penetrated the orientated glass fibre fabric and the surface of the phenolic resin foam, and a curable material from the second surface layer of SMC penetrated the opposite surface of the phenolic resin foam panel. The resulting panel had a thickness of 85 mm. A layer of Kevlar™ webbing (a poly-aramid webbing) was fixed to the second surface layer of SMC.

Four of these panels, measuring 2.0 m in height and 0.80 m in width were assembled adjacent to one another in a steel frame using expansion clips, so as to form a wall of approximately 2.4 m in height and 4.0 m in width.

An explosive charge (1800 kg of ammonium nitrate-fuel oil) was detonated at a distance of 70 m from the wall, to produce a shock wave having an impulse of 150 psi·ms$^{-1}$.

A pressure monitor positioned behind the wall during the detonation recorded no change in pressure due to the explosive blast. In addition, no damage to the panels was observed.

Example 2

A blast resistant panel was constructed from a core comprising a first solid open-cell phenolic resin foam panel (40 mm thickness) bonded to a reinforcing layer of glass fibre reinforced plastic (13 mm) which was itself bonded to a second solid open-cell phenolic resin foam panel (40 mm thickness). Thus, the core comprised a glass fibre reinforced plastic material bonded between two phenolic resin foam panels. A first surface layer of SMC (1.5 mm) and a second surface layer of SMC (1.5 mm) were bonded to the first and second solid open-cell foam panels, respectively. A layer of orientated glass fibre fabric (1 mm) was provided between the first solid open-cell phenolic resin foam panel and the first surface layer of SMC. The constituent layers of the blast-resistant panel were assembled, heated and pressed to cure the SMC, such that a curable material from the first surface layer of SMC penetrated the orientated glass fibre fabric and the surface of the first solid open-cell phenolic resin foam panel, and a curable material from the second surface layer of SMC penetrated the opposite surface of the phenolic resin foam panel. The resulting panel had a thickness of 85 mm. A layer of Kevlar™ webbing (a poly-aramid webbing) was fixed to the second surface layer of SMC.

As above, four of these panels, measuring 2.0 m in height and 0.80 m in width were assembled adjacent to one another in a steel frame using expansion clips, so as to form a wall of approximately 2.4 m in height and 4.0 m in width.

An explosive charge (1800 kg of ammonium nitrate-fuel oil) was detonated at a distance of 70 m from the wall, to produce a shock wave having an impulse of 150 psi·ms$^{-1}$.

A pressure monitor positioned behind the wall during the detonation recorded no change in pressure due to the explosive blast. In addition, no damage to the panels was observed.

Comparative Example 3

A wall measuring approximately 2.4 m in height, 4.0 m in width and 0.20 m in depth was constructed from concrete blocks of approximate dimensions 15 cm in height, 30 cm in length and 20 cm in depth and standard building mortar.

An explosive charge (1800 kg of ammonium nitrate-fuel oil) was detonated at a distance of 70 m from the wall, to produce a shock wave having an impulse of 150 psi·ms$^{-1}$. The wall was totally demolished, with none of the mortar joints remaining intact and with a majority of the concrete blocks fragmenting.

The invention claimed is:
1. A method of forming a reinforced wall for use in constructing a building, wherein the method comprises
providing a blast-resistant wall, comprising:
a layered composite panel, wherein the layered composite panel comprises a core having a first solid, open-cell phenolic resin foam panel bonded together with a second solid, open-cell phenolic resin foam panel and at least a third solid, open-cell phenolic resin foam panel by a bonding agent so as to form a monolithic core structure, and a reinforced webbing material bonded to or positioned across a rear surface of the layered composite panel;
wherein the first solid open-cell phenolic resin foam panel is progressively non-elastically deformable;
wherein the third solid, open-cell phenolic resin foam panel forms a sandwich with the first and second solid foam panels, such that two solid open-cell phenolic resin foam panels form outer panels which sandwich an inner panel of a solid open-cell phenolic resin foam panel, and wherein an inner solid foam panel of the sandwich has a resistance to deformation that is lower than the outer solid foam panels; and
wherein the inner solid foam panel has a density of about 100 to about 140 kg·m$^{-3}$, and the outer solid foam panels have a density of about 130 to about 170 kg·m$^3$; and
wherein the layered composite panel further includes a first surface layer of a sheet comprising polymeric material bonded to a surface of the monolithic core structure; and
wherein the layered composite panel is capable of withstanding an energy wave having an impulse of at least 20 psi·ms$^{-1}$.
2. The method according to claim 1, wherein the first surface layer of the sheet comprising polymeric material comprises a cured polymeric material.
3. The method according to claim 2, wherein the cured polymeric material penetrates a surface of the first solid, open-cell phenolic resin foam panel so as to form a bond between the first surface layer and the monolithic core structure.
4. The method according to claim 2, wherein the sheet comprising polymeric material comprises a matrix comprising a thermosetting polymer resin.
5. The method according to claim 4, wherein the thermosetting polymer resin is selected from at least one member of a group consisting of: polyester resins, vinyl ester resins, epoxy resins, phenolic resins, bismaleimide resins, and polyimide resins.
6. The method according to claim 4, wherein the first solid open-cell phenolic resin foam panel comprises a foam having an average cell diameter in the range of about 0.5 mm to about 5 mm, and wherein a portion of the sheet comprising polymeric material penetrates the first solid, open-cell phenolic resin foam panel to a depth which is at least equivalent to the average cell diameter of the foam.
7. The method according to claim 1, wherein the first solid, open-cell phenolic resin foam panel includes a finely-divided particulate reinforcing material.
8. The method according to claim 7, wherein the finely-divided particulate reinforcing material is a metallic particulate.
9. The method according to claim 7, wherein the finely-divided particulate reinforcing material is selected from a member of a group consisting of: clays, clay minerals, talc, vermiculite, metal oxides, refractories, solid or hollow glass microspheres, fly ash, coal dust, wood flour, grain flour, nut shell flour, silica, mineral fibers, chopped fibers, finely chopped natural or synthetic fibers, ground plastics and resins, pigments, powdered paint, carbon black, and starches.
10. The method according to claim 1, wherein the first solid, open-cell phenolic resin foam panel comprises an open-cell foam matrix formed from a phenolic resin and further comprises a member of a group consisting of: chips of stone, ceramic, glass, and other aggregate materials embedded in the open-cell foam matrix.
11. The method according to claim 1, wherein the inner solid foam panel has a density of about 115 to about 125 kg·m$^{-3}$, and the outer solid foam panels have a density of about 145 to about 155 kg·m$^{-3}$.
12. The method according to claim 1, wherein the first solid open-cell phenolic resin foam panel comprises a foam having an average cell diameter in the range of about 0.5 mm to about 5 mm.
13. The method according to claim 1, wherein the bonding agent used to bond the first and second solid, open-cell phenolic resin foam panels comprises one or more elastomers.
14. The method according to claim 13, wherein the first solid open-cell phenolic resin foam panel comprises a foam having an average cell diameter in the range of about 0.5 mm to about 5 mm, and the one or more elastomers penetrate the first solid, open-cell phenolic resin foam panel to a depth which is at least equivalent to the average cell diameter of the foam.
15. The method according to claim 13, wherein the second solid open-cell phenolic resin foam panel comprises a foam having an average cell diameter in the range of about 0.5 mm to about 5 mm, and the one or more elastomers penetrate the second solid, open-cell foam panel to a depth which is at least equivalent to the average cell diameter of the foam.
16. The method according to claim 1, wherein the sheet comprising polymeric material comprises reinforcing fibers.

17. The method according to claim 16, wherein the reinforcing fibers include one or more of carbon fibers, glass fibers, aramid fibers, and polyethylene fibers.

18. The method according to claim 1, wherein the sheet comprising polymeric material has a thickness in the range of from about 0.5 to about 25 mm.

19. The method according to claim 1, wherein the monolithic core structure comprises one or more further solid foam panels.

20. The method according to claim 19, wherein the solid foam panels of the monolithic core structure are coextensive with one another.

21. The method according to claim 19, wherein the monolithic core structure comprises one or more further solid foam panels.

22. The method according to claim 21, wherein the one or more further solid foam panels comprises a solid open-cell polymeric foam.

23. The method according to claim 19, wherein the monolithic core structure comprises at least one reinforcing layer.

24. The method according to claim 19, wherein the monolithic core structure comprises at least one further layer of a sheet comprising polymeric material.

25. The method according to claim 1, wherein the layered composite panel further comprises a second surface layer of a sheet comprising polymeric material, and wherein the monolithic core structure is disposed between the first surface layer of the sheet comprising polymeric material and the second surface layer of the sheet comprising polymeric material.

26. The method according to claim 1, wherein the layered composite panel has a profiled surface, wherein the first surface layer of the sheet comprising polymeric material is bonded to a surface effect material.

27. The method according to claim 1, wherein the monolithic core structure has a thickness in the range of from about 20 to about 500 mm.

28. The method according to claim 1, wherein the layered composite panel has a thickness in the range of from about 21 to about 5501 mm.

29. The method according to claim 1, wherein the reinforced webbing material is selected from a poly-aramid webbing or an ultra-high molecular weight polyethylene (UHMWPE) webbing material.

\* \* \* \* \*